Patented Feb. 28, 1939

2,149,064

UNITED STATES PATENT OFFICE 2,149,064

ANTHRAQUINONE DERIVATIVES AND PROCESS OF PREPARING THE SAME

Walter Mieg, Opladen, Germany, assignor to General Aniline Works, Inc., New York, N. Y., a corporation of Delaware No Drawing. Application July 26, 1935, Serial No. 33,417. In Germany August 1, 1934

4 Claims. (Cl. 260—316)

The present invention relates to new anthraquinone derivatives and to the process of preparing the same.

I have found that anthraquinone derivatives which correspond to the carbazole type are obtained by causing agents being capable of splitting off hydrogen halide to react upon alpha-arylaminoanthraquinones, the arylamino group being a phenylamino or a 2-naphthylamino group, in which one orthoposition of the imino group in the one nucleus is unsubstituted and in the other nucleus substituted by halogen. It is to be understood that also those alpha-arylaminoanthraquinones fall within the scope of my present invention in which the arylamino group is derived from the p, p'-diaminodiphenyl, one hydrogen atom of each amino group being replaced by an anthraquinone radical. The aromatic nuclei of the arylamino group may contain various substituents, such as alkyl groups or a phenyl group. The anthraquinone residue may also possess substituents, such as, for example, halogen atoms or ethylamino groups. Obviously, the anthraquinone nucleus may contain a further arylamino group of the character described in other alpha-positions, and, furthermore, the aryl residue may contain two alpha-aminoanthraquinones without departing from the sense of my invention. These cases are, therefore, intended to fall within the scope of the claims.

As agents which are capable of eliminating hydrogen halide there may be preferably employed potassium carbonate, advantageously in the presence of a suitable high boiling solvent, such as nitrobenzene, cresol or benzyl alcohol, or also alkali metal hydroxides, dissolved in an aliphatic alcohol, such as n-butyl alcohol or amyl alcohol, or also a phenol. If necessary, the splitting off of hydrogen halide may be accelerated by the addition of a small amount of catalytically acting agents, such as copper or its salts.

The products which are obtainable in accordance with my present process probably correspond to the carbazoles of the following type

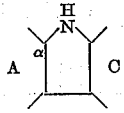

wherein A represents an anthraquinone residue and C represents a benzene nucleus which can be connected with one further nucleus. The definition given for C is intended to include also compounds of the diphenyl type. Of particular importance are such aromatic groups as contain at least two benzene nuclei either in the condensed state (naphthalene type) or connected like diphenyl compounds.

The products which are obtainable in accordance with my new process may be applied for dyeing purposes, but they are also valuable intermediate products for the manufacture of dyestuffs.

The following examples illustrate the invention, without, however, restricting it thereto, the parts being by weight:—

Example 1

A mixture of 7 parts of 1-anilido-2-bromoanthraquinone, 8 parts of potassium carbonate and 80 parts of nitrobenzene is heated to boiling for about 3 hours while stirring, until the originally red coloration of the melt has turned to brownish-yellow. After cooling, and filtering, brownish-yellow crystals are obtained in a good yield, which crystals are successively washed with alcohol and water.

The compound thus obtained is identical with the 1, 2-phthaloylcarbazole obtained in another manner (see Berichte der Deutschen Chemischen Gesellschaft 47, page 383). On sulfonating the compound in sulfuric acid a wool dyestuff of excellent fastness properties is obtained.

By adding small amounts of a copper salt, for example, copper acetate, the reaction is considerably accelerated.

Example 2

3 parts of 1-toluido-2-bromoanthraquinone are heated to 200° C. while excluding air with 3 parts of potassium carbonate in 20 parts of para-cresol, while stirring, until the starting material has completely disappeared. After cooling, the melt is diluted with methyl alcohol and the separated orange crystals are filtered and washed as described in Example 1.

The 6-methyl-1,2-phthaloylcarbazole thus obtained dissolves in cold concentrated sulfuric acid at first with a greenish-blue coloration, which soon turns to a clear blue; by the addition of water it is precipitated with an orange yellow coloration.

Instead of para-cresol, ortho-cresol may be used at the same temperature, phenol at boiling temperature or benzyl alcohol at a temperature of about 190–200° C.

Example 3

5 parts of 1-toluido-2-bromoanthraquinone are boiled in a solution of 8 parts of potassium hydroxide in 60 parts of amyl alcohol under the reflux condenser for 3–4 hours. After cooling, the melt is diluted with about 50 parts of methyl alcohol and stirred in the open air until the oxidation of the leuco compound formed is complete. The reaction product may be recrystallized for purification from nitrobenzene or pyridine. It is identical with the carbazole obtained according to Example 2.

Example 4

A solution of 9 parts of potassium hydroxide and 5 parts of 1-toluido-2-bromoanthraquinone in 40 parts of phenol is heated to gentle boiling for about 1 hour while introducing air. The melt is cooled to 60° C., diluted with 40 parts of aqueous methyl alcohol and stirred in the open air, until the separation of the 6-methyl-1,2-phthaloylcarbazole formed is complete.

Example 5

10 parts of 1,2'-naphthylamino-2-bromoanthraquinone and 10 parts of potassium carbonate are stirred in 100 parts of boiling nitrobenzene for about 3 hours. After cooling, orange crystals separated, which dissolve in concentrated sulfuric acid first with a greenish-blue, then with a clear blue coloration. The product obtained is most likely the 1,2-phthaloyl-5,6-benzocarbazole.

In an analogous manner the 1,2-phthaloyl-6-phenylcarbazole is obtained from 1-anilido-4'-phenyl-2-bromoanthraquinone in golden lustrous crystals, soluble in concentrated sulfuric acid with a dark blue coloration.

Example 6

A mixture of 3 parts of 1-toluido-2,3-dibromoanthraquinone, 4 parts of potassium carbonate and 30 parts of nitrobenzene is heated to boiling while stirring, until from a test portion orange coloured crystals separate on cooling. The 1,2-phthaloyl-4-bromo-6-methylcarbazole thus obtained dissolves with difficulty in hot pyridine with an orange-yellow coloration, in cold sulfuric acid with a greenish-blue coloration, quickly assuming a more reddish tint.

Example 7

3 parts of 2-toluido-3-bromoanthraquinone and 6 parts of potassium hydroxide, dissolved in 25 parts of phenol, are heated to boiling for 1–2 hours. After cooling, the melt is diluted with aqueous methyl alcohol and stirred for some time while cooling with ice in the open air, whereby yellow crystals separate, which are most likely the 2,3-phthaloyl-6-methylcarbazole. The latter dissolves in concentrated sulfuric acid at first with an intensely green coloration, which soon turns to reddish-blue.

Example 8

Into a mixture of 10 parts of 1-para-toluidoanthraquinone and 40 parts of nitrobenzene a solution of 6 parts of bromine in 6 parts of nitrobenzene is gradually dropped in while stirring at room temperature. Thereby one bromine atom enters the toluido residue in ortho position to the imino group; the 1-toluido-2'-bromoanthraquinone thus formed separates in small needles.

4 parts of the compound thus obtained are heated for some hours while stirring in a solution of 4 parts of potassium hydroxide in 30 parts of para-cresol. The cooled melt is diluted with alcohol; air is then blown in in order to oxidize the leuco compound formed first. The product thus obtained is identical with the 6-methyl-1,2-phthaloylcarbazole obtainable according to Example 2.

Instead of the para-cresol phenol or amyl alcohol may be applied with the same result.

Example 9

A mixture of 4 parts of 1-para-toluido-2'-bromo-anthraquinone, 5 parts of potassium carbonate, 0.1 part of copper powder and 50 parts of nitrobenzene is boiled while stirring for about 5 hours. After cooling the 6-methyl-1,2-phthaloylcarbazole separates, which may be recrystallized, if necessary, from high boiling solvents. The condensation with potassium carbonate may also be performed with the same result with quinoline, the application of copper being superfluous in this case.

Example 10

The bromine atoms being in 1- and 5-position in 1,2,5,6-tetrabromo-anthraquinone are substituted in the usual manner by the para-aminodiphenyl residue.

6 parts of the compound thus obtained are stirred for some hours with 12 parts of potassium carbonate in 75 parts of boiling nitrobenzene. After cooling, the reaction product is isolated and for purification it is boiled out with pyridine. The product thus obtained forms brownish-yellow crystals, which dissolve in weak, fuming sulfuric acid with a dark blue coloration. The compound corresponds to the probable formula:—

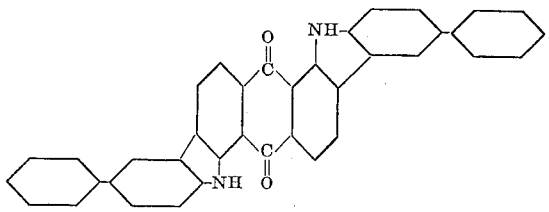

Example 11

A solution of 10 parts of 1-anilido-2',4'-dibromoanthraquinone (obtainable by reacting upon 1-anilidoanthraquinone in cold nitrobenzene with the necessary amount of bromine) and 15 parts of potassium hydroxide in 100 parts of para-cresol is heated to boiling, until the amount of the carbazole formed does not increase anymore. The cooled melt is diluted with alcohol and oxidized with air. The 6-bromo-1,2-phthaloylcarbazole is thus obtained which is soluble in concentrated sulfuric acid with a dark blue coloration.

Example 12

A compound of the following formula:—

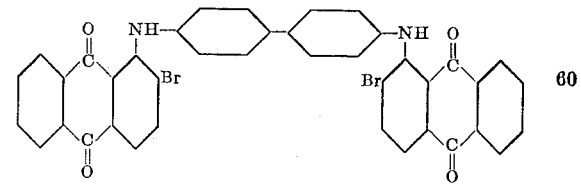

is obtained by either condensing 1 mol of benzidine with 2 mols of 1,2-dibromoanthraquinone, for example, in an amyl alcoholic solution with the addition of potassium acetate and copper salt, or by reacting upon 1-anilido-2-bromoanthraquinone with pyrolusite in sulfuric acid.

10 parts of this compound and 12 parts of potassium carbonate are boiled for about one hour while stirring in 100 parts of quinoline. The reaction product being obtained by double carbazole ring formation is difficultly soluble and forms dark brown small crystals which are soluble in concentrated sulfuric acid with a bluish-green coloration and dye cotton from a vat very fast brown shades.

Similar brown vat dyestuffs may be obtained by substituting in the above example the benzidine by other aromatic diamines, such as, for example, para-phenylene diamine or 2,6-naphthylene diamine or also compounds of the above formula, in which the benzidine residue contains substituents, for example, methyl- or methoxy groups or halogen atoms.

I claim:—

1. The process of preparing carbazole compounds which comprises treating an alpha-arylamino anthraquinone wherein the arylamino group is a member selected from the group consisting of a phenylamino and a 2-naphthylamino group and which contains in either the aryl nucleus or the anthraquinone nucleus a halogen atom in ortho-position to the imino group and has in the other nucleus one free position ortho to the imino group, with an alkali metal compound capable of splitting off hydrogen halide.

2. The process of preparing carbazole compounds which comprises treating an alpha-arylamino anthraquinone wherein the arylamino group is a member selected from the group consisting of a phenylamino and a 2-naphthylamino group and which contains in either the aryl nucleus or the anthraquinone nucleus a halogen atom in ortho-position to the imino group and has in the other nucleus one free position ortho to the imino group, with an alkali metal compound capable of splitting off hydrogen halide, the reaction being performed in the presence of a high boiling solvent.

3. The process of preparing carbazole compounds which comprises treating an alpha-arylamino anthraquinone wherein the arylamino group is a member selected from the group consisting of a phenylamino and a 2-naphthylamino group and which contains in either the aryl nucleus or the anthraquinone nucleus a halogen atom in ortho-position to the imino group and has in the other nucleus one free position ortho to the imino group, with an alkali metal carbonate.

4. The process of preparing carbazole compounds which comprises treating an alpha-arylamino anthraquinone wherein the arylamino group is a member selected from the group consisting of a phenylamino and a 2-naphthylamino group and which contains in either the aryl nucleus or the anthraquinone nucleus a halogen atom in ortho-position to the imino group and has in the other nucleus one free position ortho to the imino group, with potassium carbonate and a copper salt.

WALTER MIEG.